July 4, 1967  R. B. DEMERITT  3,329,875
VARIABLE TRIMMER CAPACITOR
Filed April 1, 1966
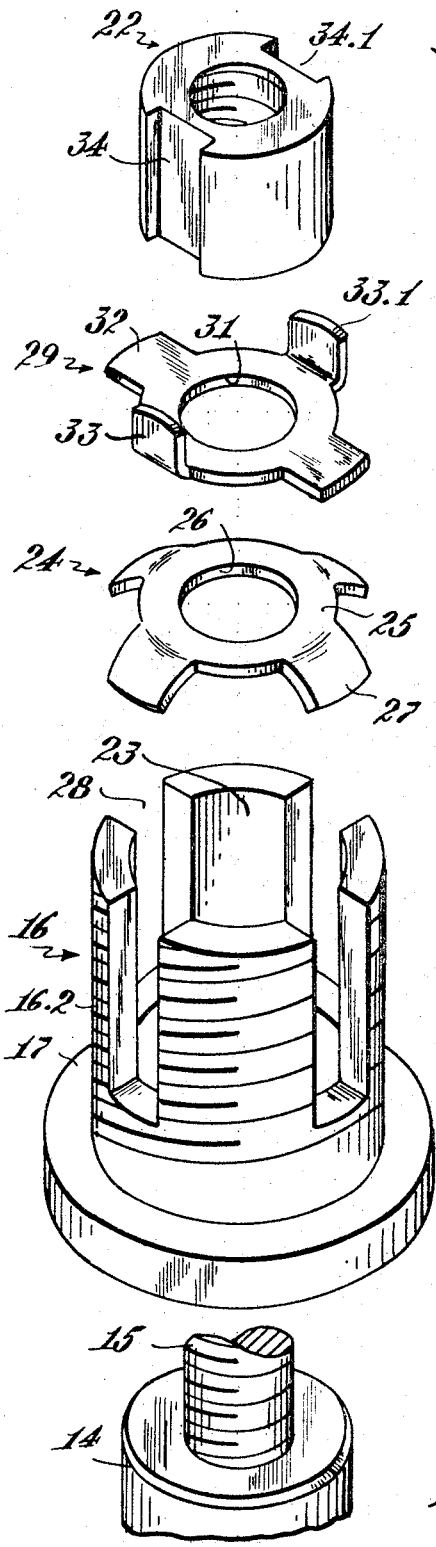
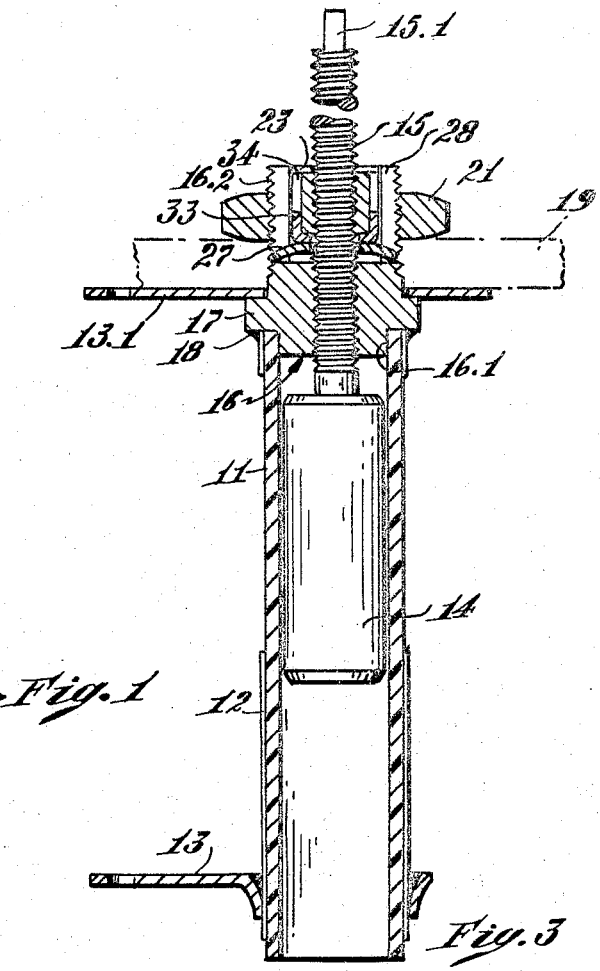
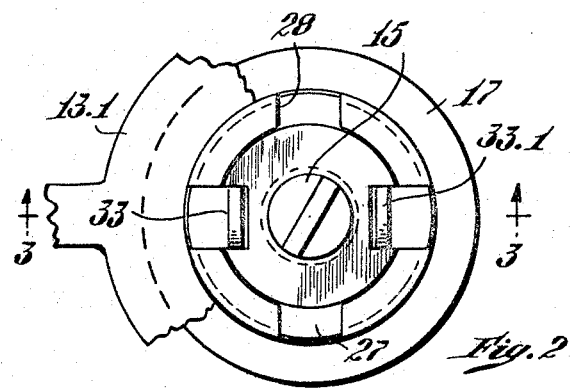
Inventor
Raymond B. Demeritt

United States Patent Office 3,329,875
Patented July 4, 1967

3,329,875
VARIABLE TRIMMER CAPACITOR
Raymond B. Demeritt, Braintree, Mass., assignor to Cambridge Thermionic Corporation, Cambridge, Mass., a corporation of Massachusetts
Filed Apr. 1, 1966, Ser. No. 539,530
6 Claims. (Cl. 317—249)

The field of the present invention relates to variable electrical impedance devices, such as trimmer capacitors or trimmer inductors, which have an adjustable element to be set and thereafter to be retained in precise adjustment until reset. More particularly, this invention relates to device wherein adjustment is effected by rotation of a screw attached to the adjustable element.

Devices of the above type, after they have been adjusted to obtain desired circuit characteristics, are often subjected to shock, vibration, and accidental collisions which tend to displace their adjustable element and to destroy the precise position within the device. It is not possible to preserve adjustment by irrevocably fixing the adjusted element in place, because it must remain movable sufficiently to compensate for aging or replacement of other circuit components.

Past efforts to retain adjustment under these conditions have taken several forms such as simple lock nuts or spindles engaged with exertion of a radial force against the spindle to increase the frictional force holding the spindle in place. Adjustment retention devices using spring means to exert an axial force between portions of the spindle threads have also been proposed, such as in the patents to Barnes 2,607,826 of Aug. 19, 1952 and Barnes 3,193,742 of July 6, 1965. These known devices have divers disadvantages such as, among others, elements which are both expensive to construct and difficult to assemble, difficult adjustment of spring tension to provide the desired amount of turning torque resistance for the spindle, and lack of provisions for varying tension after the device is assembled.

Objects of the present invention are to provide a device of the above general type using spring means to exert an axial force between portions of the spindle threads which is inexpensively constructed, easily assembled, and which permits spring tension to be easily adjusted, after assembly, to any desired value.

The nature and substance of the invention in some of its principal aspects can be shortly characterized as follows. Devices according to the invention such as trimmer capacitors or inductors have a stationary impedance member and an adjustable impedance member both rotatable and axially movable relatively to each other by means of a spindle fixed to the adjustable member. A first nut means is attached to the stationary member threadably engaging the spindle, a second nut means also threadably engages the spindle, and a compressed spring washer is disposed between the first and second nut means urging them axially apart, whereby an axial force is exerted between portions of the spindle threads. A locking washer is disposed between the first and second nut means, and has a plurality of tabs extending therefrom. The first nut means has slot means for engaging at least one of the locking washer tabs, and the second nut means has groove means for engaging at least one other of the tabs, whereby rotation of the first nut means relative to the second nut means is prevented, and the axial force is maintained constant when the spindle is rotated to adjust the apparatus impedance.

These and other objects and novel aspects of the invention will appear from the herein presented outline of its principal operation together with a detailed description of a practical embodiment illustrating its novel characteristics.

The description refers to a drawing in which:

FIG. 1 is an exploded axonometric view of a device according to the invention as adapted for use in a trimmer capacitor;
FIG. 2 is a top view of the device; and
FIG. 3 is a section on line 3—3 of FIG. 2.

In this embodiment of the invention, a trimmer capacitor has a hollow cylindrical dielectric 11, an electrically conducting metallic band 12 constituting an electrode that extends over a portion of the outer surface of the dielectric, a solder lug 13 extending from the band 12 for connection to circuitry incorporating the capacitor, and a cylindrical metallic core 14 disposed within the dielectric cylinder, coaxial therewith, and constituting the second electrode. The core 14 is rotatable and axially movable in the dielectric cylinder and according to well-known principles, the greater the overlap of the core 14 and the electrode band 12 on the dielectric, the greater will be the capacitance value.

The adjusting and adjustment retention device which is the subject matter of this invention has a spindle 15 attached to the core 14 and coaxial therewith. In the illustrated embodiment, the spindle is formed integral with the core; however, any manner of attachment which is electrically conductive is satisfactory. At the end opposite the core, the spindle is provided with a flattened portion 15.1 which permits the spindle to be gripped with pliers or the like for rotation of the spindle and adjustment of the core.

The thread of a first nut 16 engages the spindle 15. This nut is attached to the cylindrical dielectric 11. To facilitate attachment and proper alignment within the dielectric, the first nut 16 has a cylindrical portion 16.1 at one end which fits within the dielectric, and an integral flange 17 which abuts the end of the dielectric 11. The other end is threaded as indicated at 16.2. As shown in FIG. 3, solder 18 can be placed between the flange and the outer surface of the dielectric to fasten the first nut securely to the dielectric. Other fastening expedients can be used.

As illustrated, the first nut is adapted for use as a mounting stud, by means of which the trimmer capacitor may be mounted on a circuit board 19 (FIG. 3). The external threads 16.2 extending from the flange 17 to the outer end of the first nut 16 receive a standard mounting nut 21 which confines the circuit board 19 between itself and the flange 17.

The threads of a second nut 22 also engage the spindle 15. In the illustrated embodiment, this second nut is cylindrical, and fits within a cylindrical recess 23 provided in the outside end of the first nut 16.

A compressed spring washer 24 with tabs 27 is disposed between the first and second nuts, so as to urge them axially apart. The effect of spring washer 24 is to provide tension between the nuts 16 and 22, which results in a frictional binding force between the threaded portion of both nuts and the threads of the spindle 15. The tension provided by the spring washer 24 allows fine adjusting movement of the core 14 without backlash and creepage, and also maintains the latter in the precise adjusted position even when subject to jarring or vibration, thereby providing the conditions necessary for the proper functioning of the trimmer capacitor or a similar variable electrical impedance device. Because the spring washer 24 exerts force in an axial direction, it will be apparent that the force is distributed uniformly around a plurality of turns of the threaded spindle 15. Thus the frictional binding force between the threaded portion is maintained uniform, resulting in precise, consistent tracking throughout the operating range of the capacitor.

As illustrated, the spring washer 24 has a circular body portion 25 with a central hole 26 therein through which the spindle 15 freely extends. The diameter of the circular body portion 25 is substantially equal to the diameter of the recess 23 in the first nut 16, so that the spring washer cannot deviate therein and is held clear of the threads on the spindle 15. From the body portion 25 of the washer 24 extend the above-mentioned integral tab-like spring projections 27. These projections fit into slots 28 provided in the outside end 16.2 of the first nut 16 and extend to the bottom of the recess 23. The spring washer 24, easily and inexpensively formed by stamping flat material into a spherical or other curved shape, has the further advantage that it can be made very compact, thus reducing the size of the device.

Between the spring washer 24 and the second nut 22 is a locking washer 29. This locking washer has a circular body portion 30 with a central hole 31 therein through which the spindle 15 freely extends. The diameter of the circular body portion 30 of the locking washer is substantially equal to the diameter of the recess 23 of the first nut 16, so that the locking washer cannot deviate therein and is kept free of the threads on the spindle 15. The locking washer has a plurality of bendable tabs extending from the body portion 30 and angularly spaced to correspond to the angular spacing of the slots 28 of 16. At least one tab, such as 32, extends outwardly into one of the slots 28 on the first nut 16. At least one other tab, such as 33, is bent to extend axially into a groove 34 provided in the outer surface of the second nut 22. With a tab 32 engaged in a slot 28 of the nut 16, and with a tab 33 engaged in a groove 34 of 22, the locking washer 29 prohibits rotation of the second nut 22 relative to the first nut 16, and insures that the tension between them will remain constant during adjustment and while subject to shock and vibration.

To assemble the device, and to obtain the desired frictional binding force for retention of the spindle in precise adjusted position, the following steps are performed. First, the thread of the spindle 15 is engaged with the first nut 16. Next, the spring washer 24 is placed over the spindle 15 in recess 23 with projections 27 in the slots 28. Then the locking washer 29, which is initially formed flat, is placed over spindle 15 in recess 23 on top of the spring washer 24. The second nut 22 is then engaged with the spindle 15 with the flat tabs 32, 33 extending into slots 28 of the first nut 16. The nut 22 is then rotated until the spring washer 24 is sufficiently compressed and the desired frictional binding force is obtained. The second nut 22 is then slightly rotated until a groove 34 is aligned with slot 28 (FIG. 3), and a tab 33 is bent until it is confined in the groove 34. A screwdriver or similar tool, inserted from the outside through slot 28, can be used to bend the tab 33. Preferably, two opposite tab ends 33, 33.1 are bent into opposite slots 34, 34.1. It is thus apparent that the device is easily assembled and that, by a series of positive steps, without trial and error, the desired frictional binding force can be obtained and preserved. Moreover, since the tabs on the locking washer 29 are externally accessible, the frictional binding force can be easily changed at a later date with little inconvenience, and without reperforming all the assembly steps.

The desired binding force exerted on the spindle 15 by way of the spring washer 24 can be determined by a conventional tool in terms of inch-ounces of torque, prior to the bending of tabs 33.

It is evident that the amount which the second nut 22 must be rotated to align the groove 34 with the slot 28 is dependent on the number and spacing of the slots and grooves. By providing four equally spaced slots in 16, as in the illustrated embodiment, and two equally spaced grooves in 22, the second nut need be turned no more than 45° to obtain alignment between a groove and a slot. For most purposes this gives sufficiently precise adjustment of frictional binding force; however, if more precise adjustment is desired, a larger number of tabs and slots may be provided. It should be understood however, that the invention works with as few as two slots and one groove.

It will be apparent that, for purposes of obtaining an inductor, the electrode band 12 can be replaced by a coil structure, when the core 14 will be formed of suitable magnetic material.

In the above described embodiment, the dielectric tube 11 is made of ceramic material and the metallic band 12 is applied thereto by silvering in well-known manner. The tube 11 and the first nut 16 are assembled by induction soldering using a suitable aligning fixture. The solder lug 13 is dip-soldered to the silvered area 12 of 11. The electrical connection of the movable impedance element, here the core 14, is established through the spindle 15 and the nut 16. If desired a second, such as grounding, lug 13.1 can be inserted between the flange 17 and the nut 21, with or without board 19 therebetween.

It should be understood that this disclosure is for the purpose of illustration only and that this invention includes all modifications and equivalents which fall within the scope of the appended claims.

I claim:

1. A device for adjusting and retaining the adjustment of electrical impedance apparatus having a stationary member and an adjustable member both rotatable and axially movable therein, comprising
    a spindle attached to the adjustable member and both rotatable and axially movable therewith;
    a first nut means attached to the stationary member and threadably engaging the spindle;
    a second nut means threadably engaging the spindle;
    a compressed spring washer disposed between the first and second nut means and urging them axially apart whereby an axial force is exerted between portions of the spindle threads;
    a locking washer disposed between the first and second nut means, the locking washer having a plurality of tabs extending therefrom;
    the first nut means having slot means for engaging at least one of the tabs; and
    the second nut means having groove means for engaging at least one other of the tabs,
    whereby rotation of the first nut means relative to the second nut means is prevented, and the adjustable axial force between portions of the spindle threads is maintained constant when the spindle is rotated.

2. A device according to claim 1 wherein the second nut means is cylindrical and fits in a cylindrical recess provided in the outside end of the first nut means, and wherein both the spring washer and locking washer have a circular body portion of diameter substantially equal to the diameter of the cylindrical recess, each circular body portion having a central hole through which the spindle freely extends.

3. A device according to claim 1 wherein the first nut means has an integral flange and external threads extending from the flange to the outside end of the first nut means, whereby the first nut means can be used as a mounting stud.

4. A device according to claim 1 wherein the stationary member includes an insulating tube and a metallic coating applied to the outside thereof.

5. A device according to claim 4 wherein the adjustable member includes a core that is movable relatively to the metallic coating.

6. An adjusting and adjustment retention device for a trimmer capacitor of the type having a hollow cylindrical dielectric and a cylindrical conducting core disposed in the dielectric and coaxial therewith, comprising
    a spindle attached to the core and coaxial therewith;
    a first nut means attached to the dielectric and threadably engaging the spindle, the first nut means having at one end a cylindrical portion fitting within the dielectric, an integral flange abutting the end of said dielectric, threads over the outer surface from the flange to the outside end of the first nut means, a cylindrical recess in the outside end coaxial with the spindle, and a plurality of slots extending axially from the outside end to the bottom of the recess;

a second nut means threadably engaging the spindle, the second nut means being cylindrical and fitting within the cylindrical recess on the first nut means, and having at least one groove in the outer surface thereof extending axially;

a compressed spring washer disposed between the first and second nut means and urging them axially apart, the spring washer having a circular body portion of diameter substantially equal to the diameter of the cylindrical recess and a central hole through which the spindle freely extends; and a locking washer disposed between the spring washer and the second nut means, the locking washer having a plurality of integral tabs extending therefrom, at least one of the tabs being engaged in one slot, and at least one other of the tabs being engaged in one groove, the locking washer having a circular body portion of diameter substantially equal to the diameter of the cylindrical recess and a central hole through which the spindle freely extends.

References Cited

UNITED STATES PATENTS 2,392,701  1/1946  Sanders.
3,141,487  7/1964  Boyd _____ 151—69 X LEWIS H. MYERS, *Primary Examiner.*

E. GOLDBERG, *Assistant Examiner.*